(12) United States Patent
Touma et al.

(10) Patent No.: US 10,474,719 B2
(45) Date of Patent: Nov. 12, 2019

(54) AUTO-COMPLETION OF WIDELY SHARED SEARCH QUERIES

(71) Applicant: Google LLC, Mountain View, CA (US)

(72) Inventors: Costa Touma, Haifa (IL); Boaz Brickner, Qiryat Tivon (IL); Alvertos Dayid Angel, Zurich (CH); Mate Szalay, Zollikerberg (CH); Ari Shotland, Haifa (IL)

(73) Assignee: Google LLC, Mountain View, CA (US)

( * ) Notice: Subject to any disclaimer, the term of this patent is extended or adjusted under 35 U.S.C. 154(b) by 524 days.

(21) Appl. No.: 15/176,393

(22) Filed: Jun. 8, 2016

(65) Prior Publication Data

US 2017/0192991 A1    Jul. 6, 2017

Related U.S. Application Data

(63) Continuation of application No. PCT/GR2015/000066, filed on Dec. 30, 2015.

(51) Int. Cl.
*G06F 16/9032* (2019.01)
*G06F 16/242* (2019.01)
(Continued)

(52) U.S. Cl.
CPC .... *G06F 16/90324* (2019.01); *G06F 16/2423* (2019.01); *G06F 16/3322* (2019.01); *G06F 16/9535* (2019.01)

(58) Field of Classification Search
CPC .......... G06F 17/3064; G06F 17/30867; G06F 17/30864; G06F 17/3097; G06F 3/0482;
(Continued)

(56) References Cited

U.S. PATENT DOCUMENTS 6,564,213 B1    5/2003 Ortega et al.
7,774,003 B1    8/2010 Ortega et al.
(Continued)

FOREIGN PATENT DOCUMENTS

WO    WO 2012/058076    5/2012

OTHER PUBLICATIONS

International Search Report and Written Opinion in International Application No. PCT/GR2015/000066, dated Jul. 28, 2016, 12 pages.

(Continued)

*Primary Examiner* — Angelica Ruiz
(74) *Attorney, Agent, or Firm* — Fish & Richardson P.C.

(57) ABSTRACT

Methods, systems, and apparatus, including computer programs encoded on computer storage medium, for facilitating auto-completion of search queries in a group based document sharing environment. In one aspect, a method includes actions of maintaining a prefix index that includes prefix index entries. Each prefix index entry may include a prefix, a group identifier, and a portion of a document. Additional actions may include receiving input from a user that is associated with a search field, determining a user identifier associated with the user that submitted the received input, mapping the user identifier to a particular group identifier, obtaining one or multiple candidate query suggestions based on the received input and the prefix index, and selecting a subset of the candidate query suggestions based on the particular group identifier. Other actions may include providing the subset of candidate query suggestions to the user.

18 Claims, 3 Drawing Sheets

(51) Int. Cl.
*G06F 16/332* (2019.01)
*G06F 16/9535* (2019.01)

(58) Field of Classification Search
CPC ......... G06F 17/30554; G06F 17/30991; G06F 17/3087; G06F 9/451
USPC ........... 707/600–831, 899, 999.001–999.206
See application file for complete search history.

(56) References Cited

U.S. PATENT DOCUMENTS

| | | | | |
|---|---|---|---|---|
| 7,937,345 B2* | 5/2011 | Schmidtler | ............ | G06N 20/00 706/20 |
| 8,977,613 B1* | 3/2015 | Cooke | ............... | G06F 17/30867 707/732 |
| 2009/0006543 A1* | 1/2009 | Smit | ................. | G06F 17/30864 709/203 |
| 2010/0191721 A1 | 7/2010 | Murthy | | |
| 2011/0184951 A1 | 7/2011 | Paparizos et al. | | |
| 2013/0238584 A1* | 9/2013 | Hendry | ............. | G06F 17/30619 707/706 |
| 2014/0164352 A1* | 6/2014 | Denninghoff | ...... | H03H 9/02622 707/711 |
| 2014/0359574 A1* | 12/2014 | Beckwith | .................. | G06F 8/33 717/113 |
| 2015/0026153 A1* | 1/2015 | Gupta | ............... | G06F 17/30336 707/711 |
| 2015/0186474 A1* | 7/2015 | Angel | ................. | G06F 17/3097 707/723 |
| 2015/0278366 A1* | 10/2015 | Pilpel | ................ | G06F 17/30867 707/723 |

OTHER PUBLICATIONS

Written Opinion issued in International Application No. PCT/GR2015/000066, dated Dec. 20, 2017, 6 pages.

* cited by examiner

AUTO-COMPLETION OF WIDELY SHARED SEARCH QUERIES

CROSS-REFERENCE TO RELATED APPLICATION

This application is a continuation of PCT Application No. PCT/GR2015/000066, filed Dec. 30, 2015, the contents of which are herein incorporated by reference.

BACKGROUND

Cloud services that facilitate email, document management, multimedia file management, and the like have become increasingly available to any user that has access to an Internet connection. The growth of easily accessible and affordable cloud storage has encouraged a shift in user behavior away from a general reliance on storing data on a user's local, personal storage device to a greater reliance on storing data utilizing one or more readily available cloud storage services. Such cloud services promise a user anywhere access, regardless of user device, which encourages users to store vast quantities of information in cloud storage repositories. However, as the user's library of digital content items grows, a single particular content item may become increasingly more difficult to locate without appropriate information discovery, search, and retrieval processes.

The benefits of cloud storage have also made it increasingly easy to share documents amongst a group of users. This aspect of user groups adds to the complexity of search and retrieval techniques in cloud based systems.

Though the challenges identified above are described with respect to cloud based document storage, it is noted that the same or similar challenges may exist in other computer networks. For instance, the same or similar challenges may exist in any network of computer devices that facilitates sharing of emails, documents, notes, or any other type of data between particular groups of users.

SUMMARY

According to one implementation of the subject matter described by this specification, a set of suggested queries may be provided to an end user. The set of suggested queries may include text that is extracted from documents that are shared amongst groups of users via a document sharing system. The set of suggested queries may be selected from a larger set of candidate queries in a manner that honors group-based access control restrictions associated with each shared document. The group-based access controls may be enforced based on a group identifier maintained in a prefix index. The group based access controls may be derived from preexisting access control restrictions that are associated with each shared document.

In some aspects, the subject matter embodied in this specification may be embodied in methods that may include the actions of maintaining a prefix index that includes a plurality of prefix index entries, wherein each prefix index entry includes a prefix, a group identifier, and a portion of a document. Additional actions may include receiving input from a user that is associated with a search field, determining a user identifier associated with the user that submitted the received input, mapping the user identifier to a particular group identifier that is associated with the user, obtaining one or multiple candidate query suggestions based on the received input and the prefix index, and selecting a subset of the candidate query suggestions based on the particular group identifier that is associated with the user. Additional actions may also include providing the subset of candidate query suggestions to the user as suggested queries.

Other versions include corresponding systems, apparatus, and computer programs, configured to perform actions of the methods, encoded on computer storage devices.

These and other versions each may optionally include one or more of the following features. For instance, in some implementations the input from the user that is associated with the search field may include a zero character input. Alternatively, the input from the user that is associated with the search field may include a single character.

In some aspects, the method may include actions that include receiving two or more inputs from the user that are associated with the search field. Additional actions performed for each received input from the user may include determining a user identifier associated with the user that submitted the received input, mapping the user identifier to a particular group identifier that is associated with the user, obtaining one or multiple candidate query suggestions based on the received input and the prefix index, and selecting a subset of the candidate query suggestions based on the particular group identifier that is associated with the user. Other actions may include providing the subset of candidate query suggestions to the user as suggested queries.

In certain implementations, selecting a subset of candidate queries based on the group identifier may include actions of determining a subset of prefix index entries that are associated with a prefix that corresponds to the received input. Then, for each prefix index entry, additional actions may include determining whether the particular group identifier that is associated with the user corresponds to a group identifier associated with the prefix index entry; and in response to a determination that the particular group identifier that is associated with the user corresponds to the group identifier associated with the prefix index entry, selecting the portion of the document that is associated with the prefix index entry for inclusion as a candidate query in the subset of candidate queries.

Yet other implementations may also include actions for generating a group score that is associated with each candidate query suggestion and unique to each particular group and ranking the suggested queries based on the group score, wherein the candidate query may include one or multiple words. In some implementations, the group score may be based on the number of times each of the one or multiple words appear in documents associated with each respective group of users.

In other aspects, the subject matter embodied in this specification may be embodied in methods that may include the actions of receiving a string of one or more characters that is input by a user into a query input field. Other actions may include transmitting, to an auto-complete engine, a request for suggested queries that are associated with the string of one or more characters, receiving one or more particular suggested queries that are associated with the string of characters, and providing, for output, one or more of the particular suggested queries that are associated with one or more resources that are indicated as accessible by a group of users that includes the user.

Other versions include corresponding systems, apparatus, and computer programs, configured to perform actions of the methods, encoded on computer storage devices.

These and other versions each may optionally include one or more of the following features. For instance, the one or more particular suggested search queries provided for output may not include query terms that are associated with one or more other resources that are indicated as accessible by another group of users that does not include the user.

DETAILED DESCRIPTION

Figure 1:
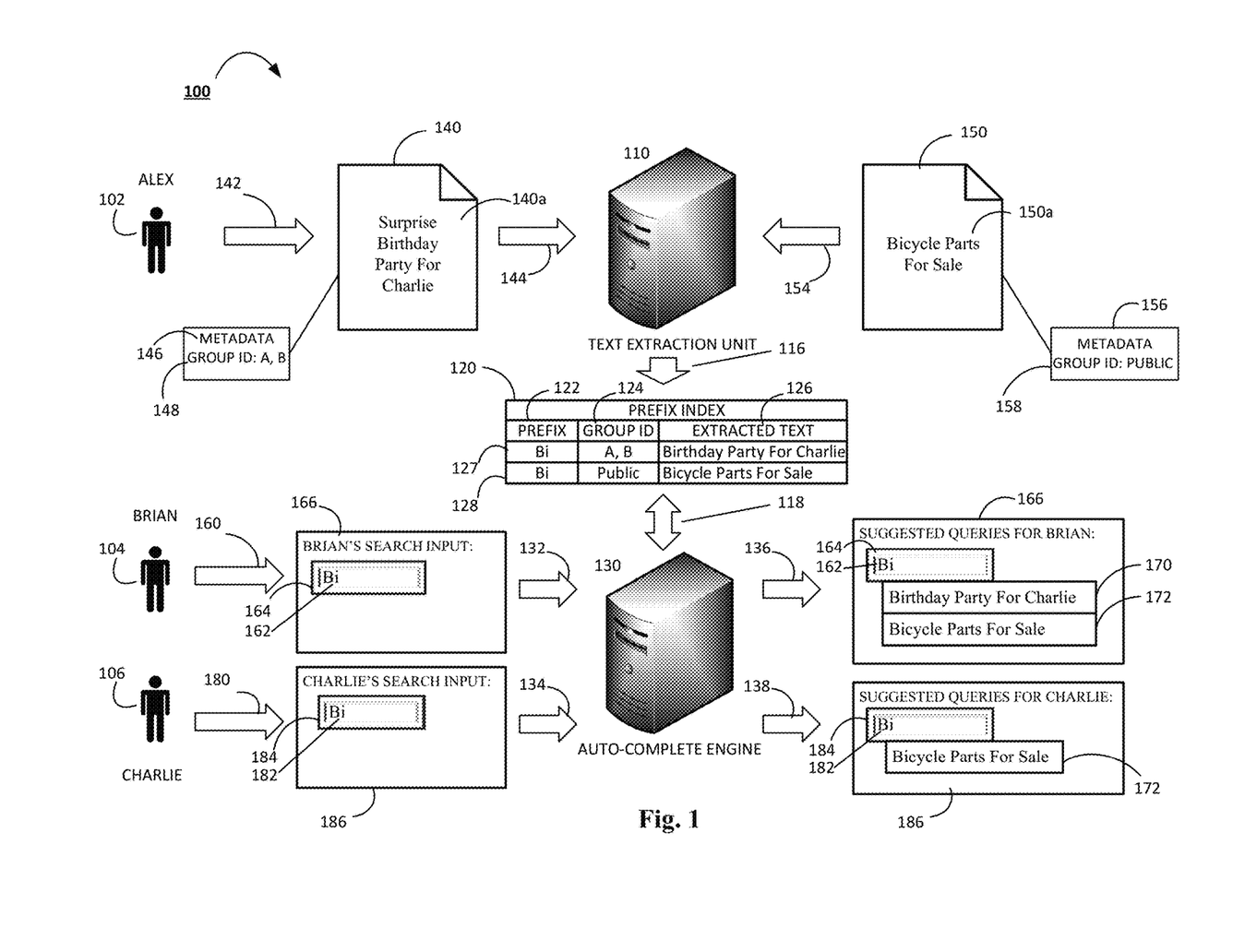
FIG. 1 is an example of a contextual diagram of an example of a document sharing system that may provide suggested queries, in accordance with one aspect of the present disclosure.

FIG. 1 is an example of a contextual diagram of an example of a document sharing system 100 that may provide suggested queries, in accordance with one aspect of the present disclosure. System 100 may include at least a text extraction unit 110, a prefix index 120, and an auto-complete engine 130.

At least one aspect of the subject matter disclosed by this specification and illustrated in FIG. 1 is related to methods, systems, and apparatus, including computer programs encoded on a computer storage medium, for storage, search, and retrieval of documents in an environment that facilitates sharing of documents amongst users or groups of users. A group of users may include, for example, a logical association of one or more users. In one aspect of the present disclosure, a group of users may be expressly defined by a user of document sharing system 100, a system administrator, or the like. Alternatively, for example, a group of users may be inferred based on, for example, a plurality of users associated with a particular domain, the sharing of files between two or more users, or the like.

The document sharing system 100 may be implemented via any network of computers that facilitates sharing of documents including, but not limited to, one or more mobile computing devices interacting with a cloud based document sharing system hosted by one or multiple cloud-based computing devices. Such document sharing systems may provide storage, management, and/or sharing of electronic documents in accordance with varying levels of scope and complexity. For example, such a document sharing system may be implemented in a small office environment. Alternatively, for example, a large, multinational corporation may utilize such a document sharing system to store a substantial portion of the corporation's documents in the cloud. Alternatively, such a document sharing system may be made publicly available via the Internet to any registered user that interacts with the document sharing system via the Internet.

Text extraction unit 110 may be configured to receive, or otherwise obtain, one or multiple documents. For instance, text extraction unit may be configured to receive a document 140 that was created 142 by a user Alex 102 and uploaded 144 via one or more networks. At least a portion of document 140 may include text content 140a. For example, user Alex 102 may create a document 140 that is intended for a limited audience and includes text content 140a that states "Surprise Birthday Party For Charlie." In addition, system 100 may assist user Alex 102 in generating metadata 146. For instance, system 100 may provide a prompt to user Alex 102 requesting that user Alex 102 provide an indication whether one or more types of metadata should be created with respect to document 140. For example, the prompt may ask user Alex 102 to input, or select, the names of each user or group(s) of users that can access document 140. Alternatively, or in addition, metadata 146 may be automatically generated by system 100. For example, system 100 may automatically generate metadata 146 based on how user Alex 102 interacts with document 140. In one aspect, for example, system 100 may generate metadata 146 that is related to document 140 based on user Alex's distribution of document 140 to a particular group of one or multiple users. System 100 may then associate the generated metadata 146 with document 140.

Metadata 146 may include, among other things, for example, data that indicates that access to document 140 is restricted to one or more groups of users that may be selected from the group of all potential users of system 100. In at least one aspect of the present disclosure, data indicating that access to a document 140 is restricted may include, for example, a Group ID 148. Though the example described with respect to system 100 presents a scenario where user Alex 102 has uploaded a document 140 that includes metadata 146, which restricts access to document 140, to a document repository that includes a text extraction unit 110, the present disclosure need not be so limited. For instance, a user such as, for example, user Alex 102, may also be able to upload documents to the document repository including text extraction unit 110 that may be similar to document 140, but do not include any restrictions to the use of the document. For instance, the document may be associated with metadata indicating that the document should be publicly available to all users. In some implementations, the lack of any metadata associated with a document may indicate that a document should be publicly available.

With respect to at least one example of system 100, user Alex 102 may want to restrict access to document 140 to a first particular group of users. For instance, assume that user Alex 102 is planning a surprise birthday party for user Charlie 106, and user Alex 102, user Brian 104, and user Charlie 106 are all friends that utilize a document sharing system consistent with aspects of system 100. User Alex 102 may decide to create document 140 which may include text content 140a that sets forth plans for a surprise birthday party for user Charlie 106. For instance, document 140 may include text content 140a that recites "Surprise Birthday Party For Charlie." Then, after creating document 140, in order to preserve the surprise, user Alex 102 may choose to share document 140 with user Brian 104, but not user Charlie 106. User Charlie's access to document 140 may be restricted, for example, based on an evaluation of one or more of a User ID associated with each user of system 100, a Group ID associated with each group of users of system 100, and/or an access control list that may be associated with document 140.

An access control list may be a whitelist that may include a list of zero or more users and/or zero or more groups of users that can access one or multiple documents associated with the access control list. Alternatively, or in addition, an access control list may be a blacklist that may include a list of zero or more users and/or zero or more groups of users that may be denied access to the particular document(s) associated with the access control list. Though a single whitelist or blacklist may be sufficient to resolve user access rights to one or multiple documents, there may be certain instances where system 100 may access both a whitelist and a blacklist in order to determine whether a particular user has access to one or multiple documents.

One or multiple individual users may be added to, or removed from, an access control list. A user may be added to an access control list by, for example, adding a User ID associated with a user to the access control list. A user may be removed from an access control list by removing a User ID associated with a user from the access control list. Alternatively, or in addition, one or more multiple users may be associated with a Group ID. In such instances, a Group ID such as, for example, Group ID 148 may be added to an access control list to indicate that an entire group of one or multiple users is granted access to a document such as, for example, document 140. An entire group of one or multiple users may be removed from an access control list by removing a Group ID associated with a particular access control list. Removal of a Group ID from an access control list may indicate that the group of one or multiple users associated with the Group ID may no longer access the document associated with the access control list. In the instances of removal of a User ID and/or Group ID from an access control list, the access rights of users associated with the removal may be immediately terminated. System 100 may facilitate mapping of a User ID to a particular Group ID. Such mapping may be able to identify an enumerated list of groups that a particular user is associated with, when provided with the user's User ID.

The use of Group IDs to control access to one or multiple documents may facilitate termination of document access rights without directly altering an access control list. For example, as described above, only a Group ID may be associated with a document's access control list. Further, each Group ID may be associated with multiple users. Accordingly, a user's access rights may be terminated by removing a particular user's name, User ID, or the like from the list of names, User IDs, or the like that are associated with a particular Group ID.

Text extraction unit 110 may also receive, or otherwise obtain, documents from other sources. For instance, text extraction unit may be configured to periodically obtain documents from one or multiple remote document sources. For instance, text extraction unit 110 may employ a web crawler, web spider or the like that may scan content sources accessible via one or multiple networks such as, for example, the Internet, in order to identify documents such as, for example, document 150 that may be obtained 154, stored, and indexed. Alternatively, or in addition, document 150 may be received by text extraction unit 110 when document 150 is uploaded by one or multiple users of document sharing system 100. At least a portion of document 150 may include text content 150*a*. For example, document 150 may include text content 150*a* that states "Bicycle Parts For Sale." In this particular instance, document 150 may be associated with metadata 156 that may indicate that document 150 is associated with a Group ID 158 that may indicate that document 150 may be generally available to the public. A document that may be generally available to the public may be accessible to all users of document sharing system 100 regardless of the User ID, Group ID, or any particular access rights that may be associated with each particular user.

Metadata 156 may become associated with document 150 when the document 150 is created. For instance, the creator of document 150 may proactively tag document 150 with metadata 156 to indicate that the document may be publicly available to all users of document sharing system 100. Alternatively, or in addition, absent an express indication by the creator of document 150 to associate metadata with document 150 that restricts access to document 150, document 150 may be automatically associated with metadata 156 by default to indicate that the document may be publicly available to all users of document sharing system 100. Alternatively, or in addition, system 100 may assist the creator of document 150 in generating metadata 156. For example, system 100 may provide a prompt to the creator of the document in order to request that the creator of the document provide an indication to confirm that metadata 156 should become associated with document 150. Alternatively, or in addition, metadata 150 may be automatically generated by system 100. For example, system 100 may automatically generate metadata 156 based on how the creator, or other user, of document 150 interacts with document 150. In aspects of the present disclosure, system 100 may associate metadata 156 with document 150 based on the distribution of document 150. For example, system 100 may automatically associate metadata 156 with a document 150 in order to tag document 150 as public upon detecting that document 150 was distributed to at least one user who is not associated with any particular private group.

Text extraction unit 110 may be configured to extract text content 140*a*, 150*a* from documents 140, 150 that have been received, or otherwise obtained, at 144 and 154 respectively. For example, text extraction unit may be configured to analyze each document 140, 150 and extract one or more multiple words or phrases from the documents. The extracted words or phrases may provide a suggestion of the content contained within documents 140, 150. In certain instances, the extracted words or phrases may be sufficient to identify documents 140, 150. The extracted words or phrases may include, for example, any word or phrase from any portion of document 140, 150 including the title of the document or any portion of the body of the document. The extracted words or phrases may also include, for example, unigrams, bigrams, n-grams, full sentences, or partial sentences. In certain instances, text extraction unit 110 may be configured to extract metadata 146, 156 associated with documents 140, 150. Extracted metadata data may include, but is not limited to, for example, metadata 148, 158 that may provide an indication as to any access restrictions that may be associated with documents 140, 150. Alternatively, or in addition, extracted metadata may include, for example, keywords that may have been previously associated with the document. The extracted content and/or metadata may be used by system 100 at 116 to create a prefix index 120.

Text extraction unit 110 may also be configured to calculate a variety of weights based on the occurrence of each word, phrase, or the like that may be extracted from documents 140, 150. For instance, text extraction unit 110 may be able to analyze a received document 140, 150 to determine the most frequently used words in each respective document. Alternatively, or in addition, text extraction unit 110 may determine the number of times that each extracted word, phrase, unigram, bigram, n-gram, full sentence, and/or partial sentence appears in a particular document. Each extracted word, phrase, unigram, bigram, n-gram, full sentence, and/or partial sentence may be associated with one or multiple counts. For instance, one aspect of the present disclosure may facilitate determination of a group term frequency count. The group term frequency count may determine how many times a particular word, phrase, or the like appears in a corpus of documents associated with a particular Group ID. For example, a group term frequency count may include the number of times the phrase "Birthday Party For Charlie" appears in documents accessible to the Group ID A, B 148 that is comprised of users such as, for example, user Alex 102 and user Brian 104. Alternatively, or in addition, each word, phrase, or the like may be associated with a public term frequency count. The public term frequency count may be associated with how many times the word, phrase, or the like appears in publicly available documents. Such frequency counts may be used, for example, to weight and/or rank suggested search queries, as described herein below.

Alternatively, or in addition, text extraction unit 110 may also assign a score to the particular document from which a word, phrase, or the like was extracted. Such a document score may be based on the quality or freshness of a document. A quality score may be indicative of how good, helpful, and/or informative a particular document may be. A freshness score may be indicative of how recently a particular document has been reviewed, updated, or the like. Accordingly, the quality score or freshness score may be used alone, or in conjunction, with each other, as well as one or more of the frequency counts identified above in order to weight and/or rank suggested search queries. For instance, a low document quality score may reduce the relevance of a suggested search query that may otherwise be associated with a high group term frequency count. Alternatively, for example, a high document quality score may increase the relevance of a suggested search query that may be otherwise associated with a relatively low group term frequency count. Other ways of weighting and/or ranking suggested queries based on one or more frequency counts, a document quality score, and/or a document freshness score also fall within the scope of the present disclosure.

Exemplary system 100 has been described generally with respect to plain text documents. However, the subject matter of the present disclosure need not be so limited. For instance, a document, such as documents 140, 150, should be interpreted broadly to include, for example, electronic documents containing text, electronic documents containing multimedia content items such as images and videos, web pages, web forums, emails, chat sessions via instant messenger or other discussions facilitated via computer systems, social network posts, comments posted to a website, contacts in an address book, calendar entries, notes, search history, or the like. Alternatively, or in addition, system 100 may also be applicable to systems that facilitate the sharing of audio files, image files, video files, and/or combinations thereof. For instance, text extraction unit may be configured to obtain, or otherwise receive, an image file at 154. Text extraction unit may then extract metadata associated with the image file such as, for example, keywords that may provide a description of the content depicted by the image file. The extracted keywords may be used by system 100 at 116 to create a prefix index 120.

Prefix index 120 may include a data structure that may be used by system 100 to provide suggested search queries. In certain instances, prefix index 120 may be conceptually implemented in a hierarchical tree-like structure. Each entry of prefix index 120 may include at least, for example a prefix 122, a Group ID 124, and extracted text 126. Prefix 122 may include zero or more characters that may be associated with the initial one or more characters of the corresponding extracted text 126 for a particular entry of prefix index 120. The Group ID 124 may include one or multiple group identifiers that may each uniquely identify a particular group that has access to a document 140, 150 that the extracted text 126 for a particular entry of prefix index 120 corresponds. For example, Group ID 124 may be obtained from an access control list that is associated with document 140, 150 that a particular prefix index entry 127, 128 may be associated with. Alternatively, or in addition, Group ID 124 may include the Group ID 148, 158 that was extracted from documents 140, 150 after documents 140, 150 were obtained, or otherwise received, by text extraction unit 110. The Group ID 124 may function as a primary key that may be used to identify a subset of prefix index entries that members of a particular group may access. Extracted text 126 may include the portion of data that was extracted from documents 140, 150 by text extraction unit 110.

Prefix index 120 may include one or multiple prefix index entries 127, 128 for each respective document 140, 150. Prefix index entry 127 is an example of a prefix index entry that may be associated with document 140. For instance, prefix index entry 127 may include a prefix "Bi" that is associated with the extracted text "Birthday Party For Charlie." Prefix index entry 127 may also be associated with a Group ID "A, B" that may provide an indication that only the group of users that comprises user Alex 102 and user Brian 104 may access document 140 associated with the extracted text "Birthday Party For Charlie." Though the example of a Group ID set forth in prefix index entry 127 includes an enumerated list of data that may correspond to particular users such as, for example, A, B, the present disclosure need not be so limited. Instead, a Group ID may comprise a string of characters that may be indecipherable alone.

Users Alex 102, Brian 104, and Charlie 106 may access, or otherwise view, extracted text 126 corresponding to a particular prefix index entry 127 if they are associated with a Group ID that corresponds to one or more Group IDs 124 associated with the prefix index entry 127. Alternatively, or in addition, an access control list may be consulted based on the Group ID 124 of a prefix index entry 127 in order to determine whether a user such as, for example, Brian 104 or Charlie 106, may be able to access, or otherwise view, extracted text 126 for a particular prefix index entry 127. Access control decisions regarding access to extracted text 126 for a particular prefix index entry 127 may be based on the same, or substantially similar, logic used to determine whether one or multiple users can access the document 140 associated with extracted text 126 for a particular prefix index entry 127.

Prefix index entry 128 is an example of a prefix index entry that may be associated with document 150. For instance, prefix index entry 128 may include a prefix of "Bi" that is associated with the extracted text "Bicycle Parts For Sale." Prefix index entry 128 may also be associated with a Group ID "Public" that provides an indication that all users of document sharing system 100 may access the document 150 with the extracted text "Bicycle Parts For Sale," regardless of the group or groups each respective user may be affiliated with.

For any particular prefix index such as, for example, prefix index 120, there may exist multiple prefix index entries 127, 128 that are each associated with the same prefix. For instance, the illustrative example of the present disclosure set forth herein with respect to prefix index 120 includes two prefix index entries 127, 128 that are each associated with the same two character prefix, for example, "Bi". Accordingly, any given prefix index 120 may be able to identify one or multiple prefix index entries 127, 128 that correspond to a received user input.

However, it is contemplated that prefixes associated with any particular prefix index entry 127, 128 may be of virtually any character length. For instance, prefix table 120 may include prefixes that range from zero characters to a maximum number of characters that may be equal to the longest string of text extracted from a document and maintained in a prefix index 120 as extracted text 126. For instance, the extracted text string "Birthday Party For Charlie" may be associated with a prefix index entry that includes a zero character prefix that comprises a blank prefix 122 field and/or some other character that may be indicative of a zero character prefix such as, for example, the value "NULL". Alternatively, or in addition, the extracted text string "Birthday Party For Charlie" may also be associated with a prefix index entry that includes a single character prefix such as, for example, "B". Alternatively, or in addition, the extracted text string "Birthday Party For Charlie" may also be associated with a prefix index entry that includes a two character prefix such as, for example, "Bi". Alternatively, or in addition, the extracted text string "Birthday Party For Charlie" may also be associated with a prefix index entry that includes a three character prefix such as, for example, "Bir". Alternatively, or in addition, the extracted text string "Birthday Party For Charlie" may also be associated with a prefix index entry that includes a 26 character prefix such as, for example, "Birthday Party For Charlie". Accordingly, the extracted text string "Birthday Party For Charlie" may be associated with multiple prefix index entries in this manner that range anywhere from zero characters up to, and including, for example, a prefix index entry that includes a prefix comprising the maximum number of characters associated with the extracted text string.

Prefix index 120 may be configured to receive 118, or otherwise obtain, input that may include, for example, a zero character input, a single character input, or a multiple character input from auto-complete engine 130. A zero character input may include, for example, a user selecting a search field with a mouse pointer, finger, or other input device. A single character input may include, for example, the input of a single alphanumeric character via an input device. A multiple character input may include, for example, the input of two or more alphanumeric characters via an input device. After receiving the input from auto-complete engine 130, prefix index 120 may facilitate a search of each prefix index entry of prefix index 120 in order to identify a subset of prefix index entries. The subset of prefix index entries may include, for example, a group of one or multiple prefix index entries that include a prefix 122 that corresponds to the received input. The extracted text 126 that corresponds to each prefix entry of the identified subset of prefix index entries may be utilized as a candidate query suggestion. Accordingly, the subset of extracted text entries 126 that corresponds to each of the identified subset of prefix index entries 127, 128 may form a group of one or multiple candidate query suggestions.

Prefix index 120, or other program logic provided by system 100, may also be used to determine whether all, or a subset, of the one or multiple candidate query suggestions associated with an identified subset of prefix index entries should be returned in response 118 to the characters received by auto-complete engine 130. The determination of whether to return all, or a subset, of the one or multiple candidate query suggestions may be based on, for example, a received User ID and Group ID 124. For example, the User ID associated with the particular user that submitted the input may be mapped to a Group ID. Next, it may be determined whether the Group ID obtained in the aforementioned mapping corresponds to one or multiple of the Group ID fields associated with each candidate query suggestion of the set of identified candidate query suggestions to determine whether the user has sufficient access privileges to view the extracted text content associated with each of the identified candidate query suggestions. Then, the subset of the identified candidate query suggestions that a user is privileged to view may be returned 118 to auto-complete engine 130. The subset of one or multiple candidate query suggestions returned to auto-complete engine 130 may be presented to a user as a suggested query. An example of the aforementioned functionality may be further described in view of the example use case of system 100 that is set forth below.

As described herein, system 100 may provide a document sharing system that may be used by one or multiple users to share one or multiple documents. Though system 100 has been described heretofore with respect to users Alex 102, Brian 104, and Charlie 106 and only two exemplary documents 140, 150, the subject matter of the present disclosure may be utilized by many users in order to access and share vast numbers of documents that have been received, or otherwise obtained, by text extraction unit 110, and then processed and parsed to generate prefix index 120.

As described above, one or multiple documents 140, 150 may be received, or otherwise obtained by text extraction unit 110. Such documents 140, 150 may be stored in one or multiple databases associated with system 100 either before, or after, the documents 140, 150 are processed by text extraction unit 110 to generate a prefix index 120. Accordingly, one or multiple users of document sharing system 100 such as, for example, users Alex 102, Brian 104, and/or Charlie 106 may have a need to locate and obtain one or multiple documents 140, 150 that have previously been stored in one or multiple databases associated with system 100. Accordingly, system 100 facilitates functionality that permits one or multiple users to submit search queries that may be executed in order to identify and retrieve documents maintained by one or multiple document databases associated with document sharing system 100. In certain instances, such search and retrieval of documents may provide suggested queries to a user in a manner that honors document access restrictions associated with documents 140, 150. For example, existing document access restrictions may be extended to one or more multiple candidate search queries that may be provided to a user as a suggestion to complete an unfinished user query.

System 100 illustrates aspects of the subject matter disclosed by this specification that facilitate the extension of document access restrictions to one or multiple candidate search queries across a corpus of widely shared documents. In accordance with one aspect of the present disclosure, a first user Brian 104 may input 160 zero, one, or multiple characters 162 into a search field 164 that may be associated with a web browser 166, or other mobile application. Alternatively, or in addition, another user Charlie 106 may similarly input 180 zero, one, or more multiple characters 182 into a search field 184 that may be associated with a web browser 186, or other mobile application. In the context of the present example set forth by system 100, both user Brian 104 and user Charlie 106 may input the same characters 162, 182, e.g., "Bi", into the search fields 164, 184 associated with each of their respective browsers 166, 186, respectively. However, it is noted that the subject matter described by the present disclosure need not be so limited. Accordingly, one or more multiple users of document sharing system 100 may each input different characters and/or a different number of characters.

Browser or application 166, 186 that is associated with each respective search field 164, 184 may be configured to receive a zero, one, or more multiple character input character from user Brian 104 and user Charlie 106, respectively. The browser or application 166, 132 may pass 132, 134 the received input to Auto-Complete Search Engine 130. In response to receiving the input from the browser or application 166, 186, Auto-Complete Search Engine 130 may interact 118 with prefix index 120. For example, Auto-Complete Search Engine may query the prefix index based on each input received from the browser or application 166, 186. For each character of the input that is passed to the prefix index 120, prefix index 120 may execute a search to identify a subset of candidate queries based on each character of the received input in real-time on a input-by-input basis.

For instance, the first search performed by Auto-Complete Search Engine 130 for a user such as, for example, user Brian 104, may be when user Brian 104 uses a mouse, finger, or other input device in order to select or activate, search field 162. In response to the activation of search field 162, Auto-Complete Search Engine 130 may pass the zero-character input to prefix index 120. The prefix index 120 may identify all prefix index entries that are associated with a prefix field that is representative of a zero character input. User Brian's User ID may be mapped to one or multiple Group IDs. The result of this mapping may include a list of Group IDs that identify groups to which user Brian 104 belongs. Then, prefix index 120 may utilize the obtained Group ID(s) to identify each of the candidate query suggestions that may be accessible to user Brian 104. Prefix index 120 may then return to Auto-Complete Search Engine 130 the entire subset of candidate query suggestions that are responsive to the zero-character input search of prefix index 120 and are also associated with a Group ID of a group to which user Brian 104 belongs. In one implementation, a zero-character input search of prefix index 120 may yield every candidate query suggestion that may be accessible to user Brian 104. Alternatively, however, the selection of a set of candidate search query suggestions in response to a zero-character input may be based on context. For instance, different candidate search queries may be identified based on the particular search field that a user activated, the User ID associated with the user, the language settings associated with a User ID, or the like.

Real-time, input-by-input identification of candidate queries may continue when user Brian 104 provides a subsequent input via search field 162. For instance, user Brian 104 may use an input device in order to input the character "B" into search field 162. In response to receipt of the input character "B", Auto-Complete Search Engine 130 may pass the input character "B" to prefix index 120. The prefix index 120 may identify all prefix index entries that are associated with a prefix field that include the character "B". User Brian's User ID may be mapped to one or multiple Group IDs. The result of this mapping may include a list of Group IDs that identify groups to which user Brian 104 belongs. Then, prefix index 120 may determine whether user Brian's Group ID(s) correspond to the Group ID 124 associated with a particular prefix index entry 127, 128. Prefix index 120 may then return the entire subset of candidate query suggestions responsive to the search of prefix index 120 based on input character "B" that are also associated with Group ID of a group to which user Brian 104 belongs. For instance, a search of prefix index 120 based on the input character "B" may yield every candidate query suggestion that may be accessible to user Brian 104 that are also associated with a first character prefix "B". Auto-complete engine 130 may continue to receive input characters from a search field 164, 184, and perform searches in real-time on an input-by-input basis for each of the one or multiple characters that may be input by a user such as, for example, user Brian 104.

In response to each real-time, input-by-input search, prefix index 120 may return 118 a subset of candidate queries to auto-complete engine 130. Auto-complete engine 130 may return multiple subsets of candidate queries at any given time that each correspond to a particular input received from a particular user such as, for example, users Brian 104 and Charlie 106. The subset of candidate queries that may be accessible to each respective user after the prefix index 120 performs candidate query authorization includes only the subset of suggested queries that a particular user is authorized to access.

Prior to providing each of the one or multiple suggested queries to each corresponding user, auto-complete engine 130 may perform one or multiple post-processing techniques to determine the appropriate rank of each suggested query in the list output to a corresponding user. The ranked list of suggested queries provided to each corresponding user at 136, 138 may be based on, for example, a calculated group term frequency count, public term frequency count, a document quality score, a document freshness score, and/or the like. In certain instances, suggested queries associated with a group term frequency count may be promoted over suggested queries associated with a public term frequency count.

In response to receiving an output 136, 138 from auto-complete engine 130, browser or mobile application 166, 186 may generate a pop-up display that includes one or multiple suggested search queries 170, 172. The suggested search queries may be based on, for example, group access rights, group term frequency counts, public term frequency counts, a document quality score, a document freshness score, and/or the like. Accordingly, even though a plurality of two or more users may provide the same input 162, 182, each respective user may receive different suggested queries based on at least the group access rights associated with each respective user.

For instance, users Brian 104 and Charlie 106 both submitted input characters "Bi." However, user Brian 104 is presented with suggested queries 170 and 172, while user Charlie is only presented with suggested search query 172. In the example depicted by system 100, suggested search query 170 is not accessible to user Charlie 106 because the Group ID field 124 of prefix index entry 127 indicates that only members of Group A, B may access the suggested query generated based on extracted text 126. To the contrary, user Brian 104 is provided suggested query 172 because user Brian 104 belongs to Group A, B, which comprises a group of users including user Alex 102 and user Brian 104. Similarly, suggested search query 172 may also be accessible to user Alex 102 because user Alex 102 is also a member of Group A, B.

The efficient implementation of real-time, input-by-input identification of candidate queries may provide significant security benefits. For instance, the real-time, input-by-input restriction of candidate query suggestions may allow for the instant removal of a user from a Group of users. For instance, the scenario may exist where user Brian 104 and user Alex 102 get into an argument, and no longer remain friends. As a result, user Alex 102 can decide to terminate user Brian's membership in Group A, B. Upon the removal of user Brian 104 from Group A, B, user Brian 104 may immediately stop receiving suggested query 170. For instance, assume user Brian 104 types the character "B," and then user Alex 102 deletes user Brian 104 from Group A, B. Consistent with the principles of the present disclosure, user Brian 104 may be presented suggested search 170 after typing in "B." However, since user Alex 102 deleted user Brian 104 from Group A, B, the moment user Brian 104 inputs the next character "i", resulting in an input string of "Bi," user Brian 104 may no longer be provided suggested search query 170 as a suggested query. Accordingly, aspects of the present disclosure may provide for the immediate termination of user accessibility to one or multiple suggested search queries.

Figure 2:
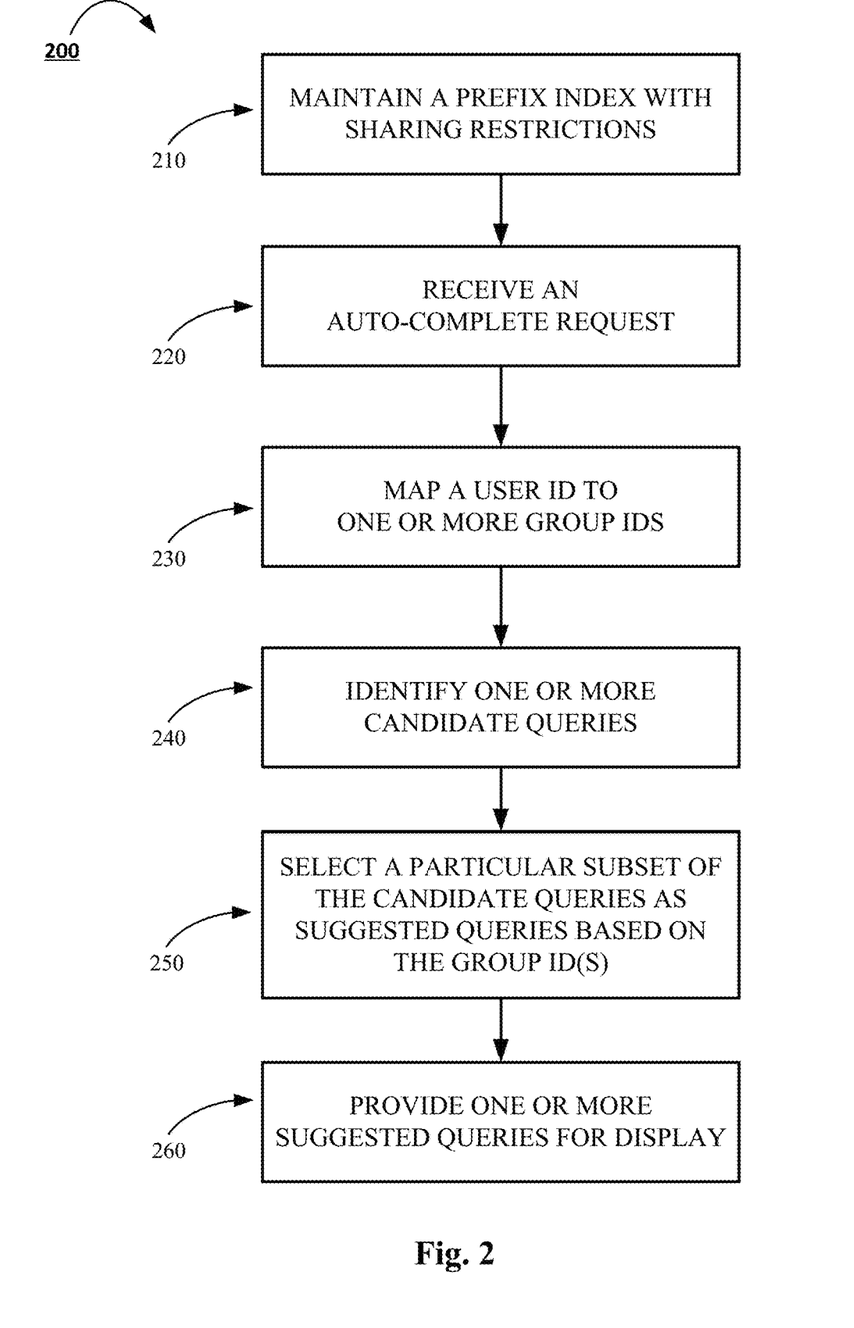
FIG. 2 is a flowchart of an example of a process that may be utilized to provide suggested queries, in accordance with one aspect of the present disclosure.

FIG. 2 is a flowchart of an example of a process 200 that may be utilized to provide suggested queries, in accordance with one aspect of the present disclosure.

Process 200 may begin at 210 with the creation and maintenance of a prefix index 120 that may be associated with candidate query access restrictions. Candidate query access restrictions may restrict access to one or multiple candidate queries based on, for example, group access rights. Candidate query access restrictions may enable, for example, a document sharing system that provide for the presentation of suggested queries based on content of the shared documents, while also keeping the content of each respective shared document confidential to all but the particular members of each respective group.

Process 200 may continue at 220 when auto-complete engine 130 receives an auto-complete request in the form of a zero-character input, a single character input, or a multiple character input from one or multiple users. Auto-complete engine 130 may also receive, or otherwise obtain, a User ID associated with the each respective user that provides an auto-complete request to auto-complete engine 130. Auto-complete engine 130 may map the User ID to a Group ID at 240. For instance, auto-complete engine 130 may use one or multiple look up tables in order to identify each particular Group ID associated with the received User ID. In certain instances, a particular User ID may be associated with multiple Group IDs. Alternatively, or in addition, auto-complete engine 130 may be able to directly obtain the Group ID based upon metadata associated with the received auto-complete request. Then, auto-complete engine 130 may pass the received auto-complete request and Group ID to prefix index 120.

Process 200 may continue at 240 after the prefix index 120 receives the auto-complete request and Group ID. Prefix index 120 may perform a real-time, input-by-input search of the received auto-complete request against each prefix index entry associated with prefix index 120 in order to identify a subset of one or multiple candidate queries at 240. Then, prefix index 120 may determine, based on the Group ID, whether the user associated with the auto-complete request may access each identified candidate query. The subset of candidate queries that may be accessible to the user who submitted the auto-complete request may be selected as a set of suggested queries at 250 based at least in part on the Group ID. Then, at 260, the selected set of suggested queries may be provided to the corresponding user's browser and/or mobile application for display as a suggested query.

Alternatively, or in addition, however, prefix index 120 may perform access authorization based on Group ID prior to searching prefix index 120. Such functionality may be beneficial as prefix index 120 becomes exceedingly large in order to reduce the amount of prefix index entries that need to be searched in order to identify a matching prefix that corresponds to the received auto-complete request. Other alternatives may exist that fall within the spirit and scope of the subject matter presented in this specification.

Figure 3:
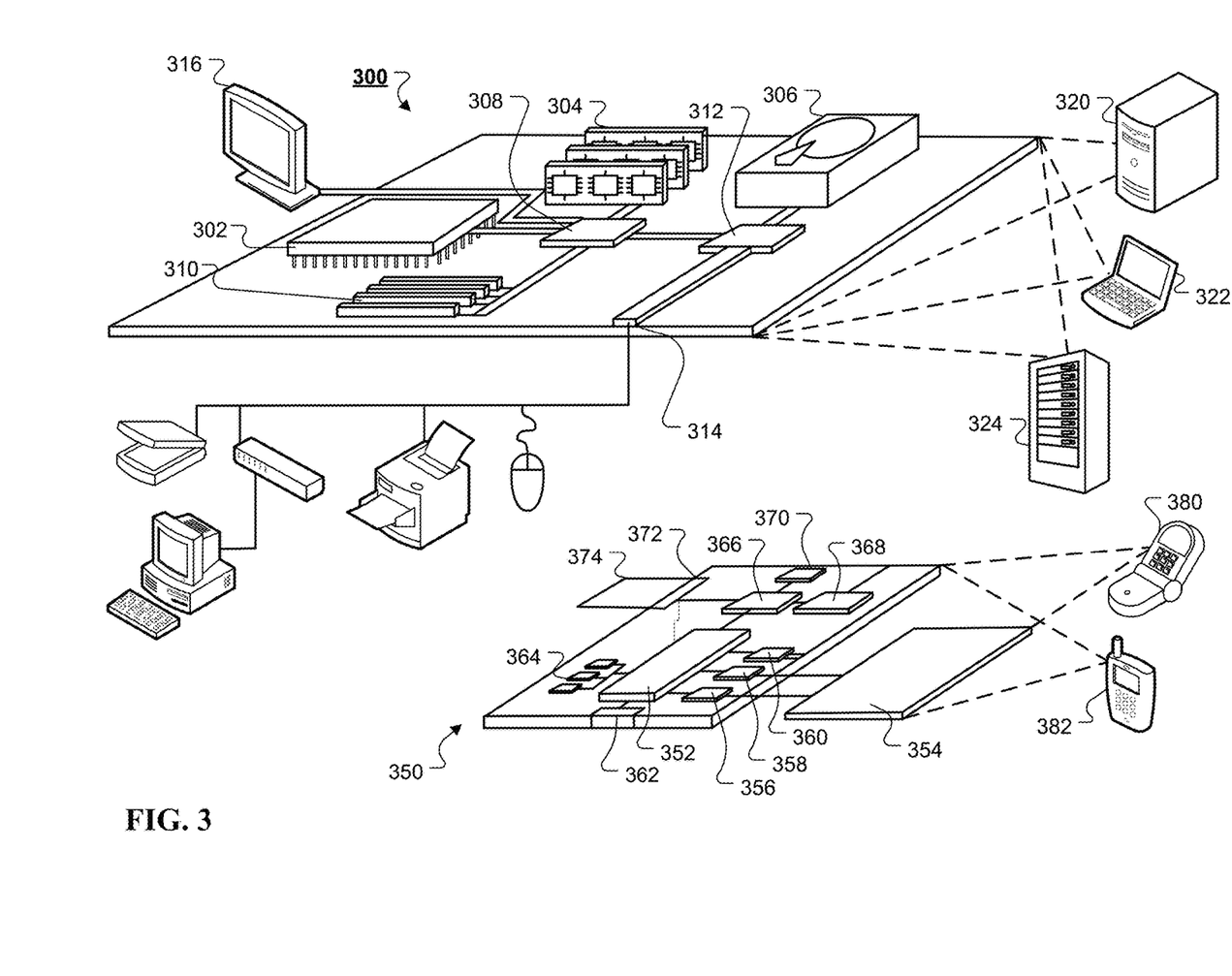
FIG. 3 shows an example of a computing device and a mobile computing device that can be used to implement the techniques described herein.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile computing devices, such as desktops, laptops, tablets, personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a graphical user interface (GUI) on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multiprocessor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. In other implementations, storage device 306 may include one or multiple cloud-based storage devices. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards. In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile computing device, such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver. In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, tablet, laptop, desktop, or other similar mobile computing device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A method comprising:
    maintaining a prefix index that includes a plurality of prefix index entries, wherein each prefix index entry includes a prefix, a group identifier that identifies a group of users that have access to a particular one of the documents, and a portion of the particular document extracted from the particular document and that begins with the prefix, and associates the prefix with the group identifier, and associates the portion of the particular document with the prefix and the group identifier;
    receiving input from a user that is associated with a search field;
    determining a user identifier associated with the user that submitted the received input;
    mapping the user identifier to a particular group identifier that is associated with the user;
    obtaining multiple candidate query suggestions based on the received input and the prefix index by identifying a subset of prefix index entries having a prefix that corresponds to the received input, each candidate query suggestion being the portion of the particular document for a prefix index entry of the subset of prefix index entries;
    selecting a subset of the candidate query suggestions based on the particular group identifier that is associated with the user, the selection comprising including in the subset candidate query suggestion that are associated with the particular group identifier that is associated with the user, and excluding from the subset candidate query suggestion that are not associated with the particular group identifier that is associated with the user; and
    providing the subset of candidate query suggestions to the user as suggested queries.

2. The method of claim 1, wherein the input from the user that is associated with the search field includes a zero character input.

3. The method of claim 1, wherein the input from the user that is associated with the search field includes a single character.

4. The method of claim 1, the method further comprising:
    receiving two or more inputs from the user that are associated with the search field; and
    for each received input from the user:
        determining a user identifier associated with the user that submitted the received input;
        mapping the user identifier to a particular group identifier that is associated with the user;
        obtaining one or multiple candidate query suggestions based on the received input and the prefix index;
        selecting a subset of the candidate query suggestions based on the particular group identifier that is associated with the user; and
        providing the subset of candidate query suggestions to the user as suggested queries.

5. The method of claim 1, wherein selecting a subset of candidate queries based on the group identifier includes:
    determining a subset of prefix index entries that are associated with prefix that corresponds to the received input; and
    for each prefix index entry:
        determining whether the particular group identifier that is associated with the user corresponds to a group identifier associated with the prefix index entry; and
        in response to a determination that the particular group identifier that is associated with the user corresponds to the group identifier associated with the prefix index entry, selecting the portion of the document that is associated with the prefix index entry for inclusion as a candidate query in the subset of candidate queries.

6. The method of claim 1, further comprising:
    generating a group score that is associated with each candidate query suggestion and unique to each particular group; and
    ranking the suggested queries based on the group score.

7. The method of claim 1,
    wherein the candidate query includes one or multiple words,
    wherein the group score is based on the number of times the one or multiple words appear in documents associated with each respective group of users.

8. A system comprising:
    one or more computers and one or more storage devices storing instructions that are operable, when executed by the one or more computers, to cause the one or more computers to perform operations comprising:
    maintaining a prefix index that includes a plurality of prefix index entries, wherein each prefix index entry includes a prefix, a group identifier that identifies a group of users that have access to a particular one of the documents, and a portion of the particular document extracted from the particular document and that begins with the prefix, and associates the prefix with the group identifier, and associates the portion of the particular document with the prefix and the group identifier;
    receiving input from a user that is associated with a search field;
    determining a user identifier associated with the user that submitted the received input;
    mapping the user identifier to a particular group identifier that is associated with the user;
    obtaining multiple candidate query suggestions based on the received input and the prefix index by identifying a subset of prefix index entries having a prefix that corresponds to the received input, each candidate query suggestion being the portion of the particular document for a prefix index entry of the subset of prefix index entries;

selecting a subset of the candidate query suggestions based on the particular group identifier that is associated with the user, the selection comprising including in the subset candidate query suggestion that are associated with the particular group identifier that is associated with the user, and excluding from the subset candidate query suggestion that are not associated with the particular group identifier that is associated with the user; and providing the subset of candidate query suggestions to the user as suggested queries.

9. The system of claim 8, wherein the input from the user that is associated with the search field includes a zero character input.

10. The system of claim 8, wherein the input from the user that is associated with the search field includes a single character.

11. The system of claim 8, the operations further comprising:

receiving two or more inputs from the user that are associated with the search field; and for each received input from the user:
  determining a user identifier associated with the user that submitted the received input;
  mapping the user identifier to a particular group identifier that is associated with the user;
  obtaining one or multiple candidate query suggestions based on the received input and the prefix index;
  selecting a subset of the candidate query suggestions based on the particular group identifier that is associated with the user; and
  providing the subset of candidate query suggestions to the user as suggested queries.

12. The system of claim 8, wherein selecting a subset of candidate queries based on the group identifier includes:

determining a subset of prefix index entries that are associated with prefix that corresponds to the received input; and for each prefix index entry:
  determining whether the particular group identifier that is associated with the user corresponds to a group identifier associated with the prefix index entry; and
  in response to a determination that the particular group identifier that is associated with the user corresponds to the group identifier associated with the prefix index entry, selecting the portion of the document that is associated with the prefix index entry for inclusion as a candidate query in the subset of candidate queries.

13. The system of claim 8, the operations further comprising:

generating a group score that is associated with each candidate query suggestion and unique to each particular group; and ranking the suggested queries based on the group score, wherein the candidate query includes one or multiple words, wherein the group score is based on the number of times the one or multiple words appear in documents associated with each respective group of users.

14. A non-transitory computer-readable medium storing software comprising instructions executable by one or more computers which, upon such execution, cause the one or more computers to perform operations comprising:

maintaining a prefix index that includes a plurality of prefix index entries, wherein each prefix index entry includes a prefix, a group identifier that identifies a group of users that have access to a particular one of the documents, and a portion of the particular document extracted from the particular document and that begins with the prefix, and associates the prefix with the group identifier, and associates the portion of the particular document with the prefix and the group identifier;

receiving input from a user that is associated with a search field;

determining a user identifier associated with the user that submitted the received input;

mapping the user identifier to a particular group identifier that is associated with the user;

obtaining multiple candidate query suggestions based on the received input and the prefix index by identifying a subset of prefix index entries having a prefix that corresponds to the received input, each candidate query suggestion being the portion of the particular document for a prefix index entry of the subset of prefix index entries;

selecting a subset of the candidate query suggestions based on the particular group identifier that is associated with the user, the selection comprising including in the subset candidate query suggestion that are associated with the particular group identifier that is associated with the user, and excluding from the subset candidate query suggestion that are not associated with the particular group identifier that is associated with the user; and providing the subset of candidate query suggestions to the user as suggested queries.

15. The computer-readable medium of claim 14, wherein the input from the user that is associated with the search field includes a zero character input.

16. The computer-readable medium of claim 14, wherein the input from the user that is associated with the search field includes a single character.

17. The computer-readable medium of claim 14, the operations further comprising:

receiving two or more inputs from the user that are associated with the search field; and for each received input from the user:
determining a user identifier associated with the user that submitted the received input;
mapping the user identifier to a particular group identifier that is associated with the user;
obtaining one or multiple candidate query suggestions based on the received input and the prefix index;
selecting a subset of the candidate query suggestions based on the particular group identifier that is associated with the user; and
providing the subset of candidate query suggestions to the user as suggested queries.

18. The computer-readable medium of claim 14, wherein selecting a subset of candidate queries based on the group identifier includes:

determining a subset of prefix index entries that are associated with prefix that corresponds to the received input; and for each prefix index entry:
determining whether the particular group identifier that is associated with the user corresponds to a group identifier associated with the prefix index entry; and in response to a determination that the particular group identifier that is associated with the user corresponds to the group identifier associated with the prefix index entry, selecting the portion of the document that is associated with the prefix index entry for inclusion as a candidate query in the subset of candidate queries.

\* \* \* \* \*

UNITED STATES PATENT AND TRADEMARK OFFICE
CERTIFICATE OF CORRECTION

PATENT NO. : 10,474,719 B2
APPLICATION NO. : 15/176393
DATED : November 12, 2019
INVENTOR(S) : Touma et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 574 days.

Signed and Sealed this
Twenty-first Day of July, 2020

Andrei Iancu
*Director of the United States Patent and Trademark Office*